United States Patent [19]

Metchev

[11] 4,376,990
[45] Mar. 15, 1983

[54] DEVICE FOR TRANSIT TIME MEASUREMENT AND METHOD

[75] Inventor: Alexander Metchev, Vienna, Austria

[73] Assignee: "Eumig" Elektrizitäts- und Metallwaren-Industrie Gesellschaft m.b.H., Wiener Neudorf, Austria

[21] Appl. No.: 182,511

[22] Filed: Aug. 28, 1980

[30] Foreign Application Priority Data

Aug. 29, 1979 [AT] Austria .................................. 5765/79

[51] Int. Cl.³ .......................... G01S 15/08; G01S 7/66
[52] U.S. Cl. ................................... 367/95; 343/7 PL;
343/7.5; 367/97; 367/101
[58] Field of Search ................ 343/7 PL, 7.5; 367/95,
367/101, 97, 903

[56] References Cited

U.S. PATENT DOCUMENTS

| 2,418,538 | 4/1947 | Yetter | 367/95 X |
| 2,994,060 | 7/1961 | Ross | 367/101 |
| 3,178,677 | 4/1965 | Hadley et al. | 367/95 |
| 3,295,127 | 12/1966 | Kross | 343/7 PL |
| 3,730,628 | 5/1973 | Wolcott et al. | 343/7.5 |
| 4,107,684 | 8/1978 | Watson, Jr. | 343/7.5 |

*Primary Examiner*—Richard A. Farley
*Attorney, Agent, or Firm*—Martin A. Farber

[57] ABSTRACT

A device for the transit time measurement of electric, electromagnetic or acoustic signals, particularly supersonic signals, of at least one predetermined frequency range, having a signal transmitter for the sending of measurement signals to an object and a signal receiver for the receiving of the measurement signals reflected by the object which have a substantially predetermined frequency corresponding to the frequency of the other signals sent and having a time measuring device for determining the transit time of the measurement signals between the signal transmitter and/or receiver and an object, from which the distance of the object from the signal transmitter and/or the signal receiver can be derived. A signal generator is provided both at least to trigger the signal transmitter and to control the signal receiver, and a filter stage for the tuning of the signal receiver in accordance with the reception frequency and for filtering out external frequencies is connected with the signal generator.

23 Claims, 14 Drawing Figures

DEVICE FOR TRANSIT TIME MEASUREMENT AND METHOD

The present invention relates to a device for the transmit time measurement of electric, electromagnetic or acoustic signals, particularly supersonic signals, of at least one predetermined frequency range, having a signal transmitter for the sending of measurement signals to an object and a signal receiver for the receiving of the measurement signals reflected by the object which have a substantially predetermined frequency corresponding to the frequency of the other signals sent out and having a time measuring device for determining the transit time of the measurement signals between signal transmitter and/or receiver and object from which the distance of the object, from the signal transmitter and/or signal receiver can be derived.

Such devices are known and are used preferably for sounding, for measuring the distance away of obstacles as so-called anti-collision devices, and for focusing in still and motion-picture cameras. Measurement signals in the ultrasonic frequency range are well-suited in particular for measuring distances within the range of a few decimeters to a few hundred meters in air or water. In this case, pulses of a carrier frequency of, for instance, between 30 kHz and 150 kHz are sent out for instance periodically by the transmitter. Although all possible structural measures are utilized on the transmission end to send the strongest possible measurement signal to the remote measurement object, the echo signal which is received back has only a very small amplitude. This amplitude decreases approximately logarithmically with the transit time of the measurement signal, i.e. with the distance away of the measurement object. In order to be able definitely to cover even objects which are more remote, it is necessary for the measurement-signal receiver to be very sensitive and furthermore to have a very narrow bandwidth with respect to the reception frequency. Only in this way is there obtained, as is known, a useful signal/noise ratio which makes it possible to utilize the desired signal. As a result of the narrow band width of the signal receiver, particularly in case of the reception of weak signals, it is necessary for the signal transmitter to be of constant frequency. This constancy of the frequency has been obtained up to now in particular by the use of quartz-stabilized oscillators. On the other hand, it was also necessary to make certain on the reception end that the signal receiver was adapted to the frequency of the quartz-stabilized transmission oscillator and that this match was maintained constant. The expenditure for this was considerable and the resultant costs high, which scarcely made the use of distance measuring devices possible for use within the consumer field, as for instance on the still or motion-picture camera market for amateur purposes.

The object of the present invention is therefore to create a device for the transit time measurement of electric, electromagnetic or acoustic signals, and particularly ultrasonic signals, by which the tuning of the signal receiver to the frequency of the transmission oscillator can be effected in a simple manner. This object is achieved in accordance with the invention in a device of the aforementioned type by the fact that in known manner the device has a signal generator which is provided both at least to trigger the signal transmitter and to control the signal receiver, and a filter stage for the reception frequency-type tuning of the signal receiver and for filtering out external frequencies is connected with the signal generator. For a different purpose it is also known to be sure, from Canadian Pat. No. 1,054,702 to use a common oscillator for transmitter and receiver, but in that case the frequency corresponding to the transmitted frequency is not received but rather, sweeping in accordance with a saw-tooth characteristic produces a frequency shift which serves as measure for the distance. This means a high expenditure for utilization. By the measures in accordance with the invention on the other hand, the result is obtained that the structural expenditure is considerably less than in known transmitter-receiver circuits and that the correct frequency tuning is at all times assured both for the transmitter and for the receiver. Changes in the transmission frequency bring about in all cases satisfactory measurement processes without any manipulation of the instrument since these changes, as a result of the simultaneous use of the signal generator also in the receiver, affect the reception frequency and/or the reception range also in corresponding manner.

As a further development of the invention it is contemplated that the signal generator be a current controlled or voltage-controlled reference oscillator of a frequency-selective filter having a phase control circuit, the filter being provided, preferably by means of a phase quadrature detector, as a demodulator for the measurement signal received.

PLL-frequency-selective filters, namely, have the advantageous property that the filter bandwidth with small input-signal amplitude is small as compared with the bandwidth for larger input-signal amplitudes. By this property there is obtained an automatic matching of the tuning of the measurement signal receiver, as a result of which assurance is had due to the internal regulation of the PLL circuit that the frequency of the transmission signal actually agrees with the reception frequency.

Another object of the invention is to improve the signal/noise ratio, or to better suppress disturbing noise. In order to achieve this object, one starts from a device for the transit time measurement of electric, electromagnetic or acoustic signals, and particularly ultrasonic signals, of at least one predetermined frequency range, having a signal transmitter triggered by a signal generator for the sending of measurement signals to an object and a signal receiver having a signal transducer and a transformer connected to the latter, in order to receive the measurement signals reflected from the object and having a time measuring device for determining the transit time of the measurement signals between signal transmitter and/or receiver and object from which the distance of the object from the signal transmitter and/or signal receiver can be derived, and it is proposed, in accordance with the invention to provide a transformer having two symmetrical secondary windings connected in series with each other, the secondary windings of said transformer being connected by a central tap with the reference potential and having their other terminals connected at least indirectly to the terminals of the signal transducer, preferably an ultrasonic capacitor transmission- and/or reception-transducer, for instance however also a piezoelectric transducer connected by tapping to the secondary windings, and for the output signals at the symmetrical secondary windings of the transformer to be conducted in each case by an impedance transducer stage to the inverting and non-inverting inputs of a first operational amplifier whose output signal is fed via a resonant circuit for the desired signal to a second operational amplifier whose amplification is greater than 1 for alternating current signals and equal to 1 for direct current signals, a common negative feedback being provided for both operational amplifiers in order to stabilize their operating points, while for the first operational amplifier there is provided an input to its current-dependent amplification control. In this way one obtains, in addition, a good voltage match to a piezoelectric transducer so that the circuit is equally well suited for capacitor and for piezoelectric transducers.

Furthermore the circuit for periodically repeated delay-time measurements is to be developed as simply as possible. For this purpose one starts from a device for the transit time measurement of electric, electromagnetic or acoustic signals, particularly ultrasonic signals of at least one predetermined frequency range, having a signal transmitter for sending measurement signals out to an object and a signal receiver for receiving the measurement signals reflected by the object, as well as a time-measurement device for determining the transit time of the measurement signals between signal transmitter and/or receiver and object from which the distance of the object from the signal transmitter or signal receiver can be derived, there being provided at least one signal transducer connected with a transformer and, in accordance with the invention, in order to control the transmission and reception of the transit time measuring device there is provided a clock generator whose periodic output pulse is provided at least for the indirect actuation of a primary winding of the transformer, for the actuation of a current generator for the gain control of the signal receiver, preferably for the activation of a function generator for the frequency modulation of the transmission signal, and for at least indirect production of a starting pulse for the transit time measurement period, the length of which is preferably determined by the output signal of the filter having the phase control circuit.

The greater the distance to be measured, and thus the longer the transit time of the measurement signal, the smaller the amplitude of the echo signal. In order now to bring about in simple fashion an adaptation of the amplification to longer signal paths, it is provided in accordance with the invention, that on a device for the transit time measurement of electric, electromagnetic or acoustic signals, and particularly ultrasonic signals, of at least one predetermined frequency range which device has a signal transmitter for the sending of measurement signals out to an object and a signal receiver having at least one reception amplifier for the measurement signals reflected by the object and transduced by means of a signal transducer, and a time measuring device for determining the transit time of the measurement signals between signal transmitter and/or receiver and object from which time the distance of the object from the signal transmitter and/or signal receiver can be derived, that, for the control of the gain of the reception amplifier or amplifiers as a function of the transit time and the current, a signal which changes linearly over the time, and in particular at least over a part of the duration, of the transmission pulse is used to activate transistors (preferably two transistors) in whose load circuits ohmic resistances are provided, the activating of the two transistors taking place via base series resistors, and that, in parallel to an ohmic resistance there is connected a, and particularly a controllable semi-conductor path, preferably the drain-source path of a field effect transistor, said path being activated at least indirectly also by the signal which varies here, the entire current through the ohmic resistances and the parallel-connected semi-conductor path which varies in value with time resulting in a non-linear preferably logarithmic or exponential course during the reception-readiness time of the measurement signal receiver.

The devices described above can be used advantageously for the readjustment of the focus of a lens. Now, however, known regulating systems tend to oscillate. In order to avoid control oscillations, there is proposed a method of control or regulation in which an actual value is compared with a desired value and a control variable is formed in accordance with the difference between them and with due consideration of hysteresis, preferably for the adjustment of a control member in or on a lens, for instance for the focusing thereof, which method in accordance with the invention, is so developed that the hysteresis is changed in accordance with the difference, for instance proportionally. A device for carrying out the method which has an actual-value transmitter and a desired-value transmitter at the input of a comparison stage having a hysteresis adjusting device can then be characterized by the fact that the hysteresis adjustment device is developed as control stage to which the output signal of the comparison stage can be fed as a control variable.

As is frequently the case in control systems, and for instance also upon control for constant tape tension despite varying reel diameters in tape transport systems (particularly for magnetic tapes or film strips), a hyperbolic function must be electrically formed even upon automatic distance adjustment by means of a focusing member of a lens. In order to achieve this by simple means, a circuit arrangement is proposed for forming a hyperbolic characteristic of the general formula $x/(x+a)$ in a control or regulating device, particularly for representing the mathematical relationship between the displacement path of the focusing member of an optical system and the distance adjustment thereof which results therefrom, which in accordance with the invention has a voltage divider which has, in at least one of its branches, a plurality of resistors which are parallel to each other and graduated with respect to their resistance in accordance with an inverse function, said resistors being adapted to be optionally connected by means of a switching device, a signal which varies substantially in accordance with the hyperbolic characteristic with the switching of the switching device being adapted to be obtained from the central tap of the voltage divider.

Embodiments of the invention are shown diagrammatically in the drawing, in which:

FIGS. 3A, 3B show a variant of FIG. 1, with further details;

FIG. 4 shows a modified embodiment of a detail contained in FIG. 3B which in

Figure 1:
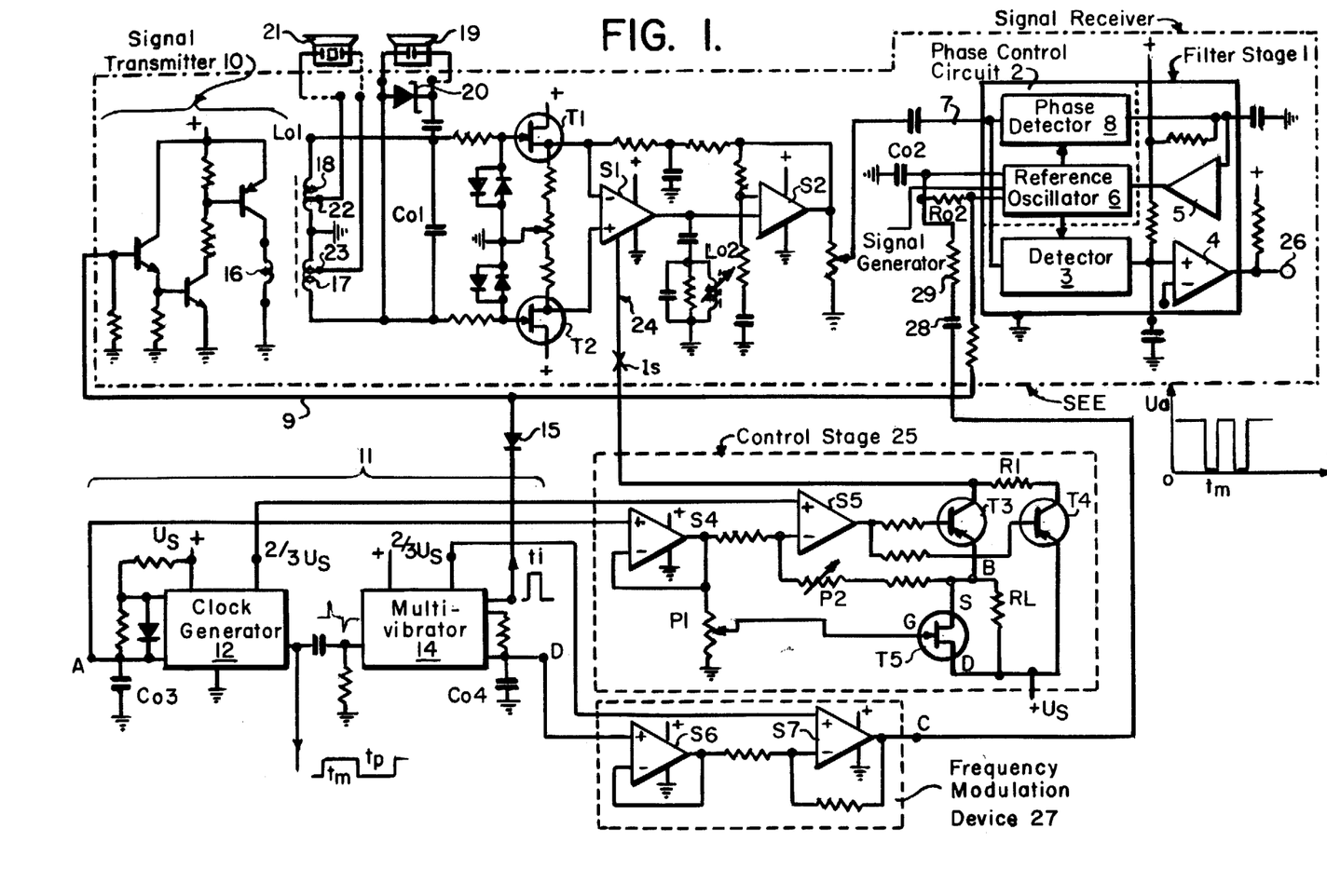
FIG. 1 shows, partially in the form of a block diagram, the circuit of a transmission receiver for ultrasonic signals.
Figure 2A:
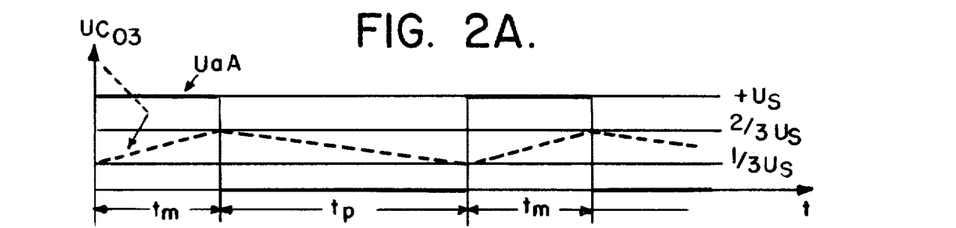
FIGS. 2A to 2E are diagrams of the course of signals of the circuit arrangement of FIG. 1.
Figure 2B:
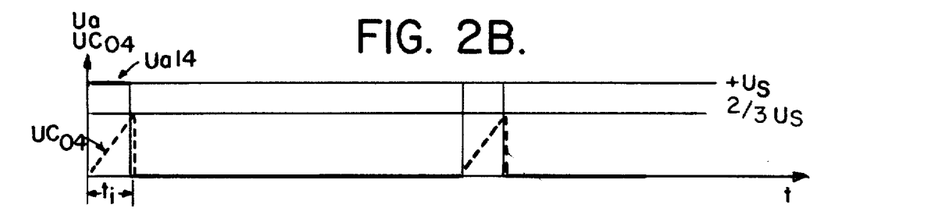

FIG. 1 shows a frequency selective system 1 based on the phase locked loop principle, which has a PLL stage 2, a phase quadrature detector 3, a comparator 4 and an amplifier 5. The phase control circuit (PLL) has the purpose of so regulating the frequency and phase of an oscillator 6 that its phase agrees with the phase of a reference signal, i.e. the signal at the input 7 of the phase detector 8. The entire control process is known as phase synchronization. The (current-controlled) oscillator 6 is used both in transmission operation and in reception operation of the device for the transit time measurement. The frequency adjustment of the oscillator 6 is effected in transmission operation, i.e. when no useful signal is present at the input 7 of the phase detector 8 from the capacitor $C_{02}$ and the resistor $R_{02}$. The example described here concerns a transmission-reception device for ultrasonic signals, and the transmission frequency set by the frequency determining RC member $R_{02}$, $C_{02}$ can amount to 50 kHz. The output signal of the current-controlled oscillator 6 is conducted via a line 9 to the driver and end stage 10 for the ultrasonic transducer. The activating of the ultasonic transducer is effected periodically by a device 11 for the transmitter pulse keying. The clock generator 12 via its output 13 triggers the monostable multivibrator 14 whose output is connected via the diode 15 with the line 9 for the activating of the amplifier stage 10. In FIG. 2A the pulse $U_{aA}$ at the output A of the clock generator 12 is shown in solid line. The course of the voltage at the capacitor $C_{03}$ which participates in determining the clock time of the clock generator 12 is shown also in FIG. 2C, in the form of a dashed line $U_{C\,03}$. The pulse $U_{aA}$ is about 60 milliseconds wide and is periodically given off by the clock generator 13. A clock period consists of the pulse $U_{aA}$ for the time $t_m$ and the pulse interval for the time $t_p$. During these times, the capacitor $C_{03}$ is charged once from $\frac{1}{3}$ of the supply voltage $U_S$ to $\frac{2}{3}$ of the supply voltage $U_S$ and discharged again linearly during the pulse interval. The course of the voltage at the capacitor $C_{04}$ of the monoflop 14 (Point D), which capacitor also serves to determine the time, is shown in FIG. 2B by the dash line $U_{C04}$. The time that the monostable multivibrator 14 remains in activated condition is about 1 millisecond and is designated $t_i$ in FIG. 2B. The pulse itself at the diode 15 is designated $U_{a\,14}$.

As already mentioned, in the amplifier stage 10 the signal of the current-controlled oscillator 6 of the PLL circuit 1 is amplified in voltage and then in current and fed via the transformer $L_{01}$ to the ultrasonic transducer. The transformer $L_{01}$ has a primary winding 16 and two series-connected symmetrical secondary windings 17 and 18 which are connected via their central tap with the reference potential. The resonance matching for the capacitor transducer 19 is effected with the capacitor $C_{01}$. The polarization voltage necessary for the operation of a capacitor transducer is obtained via a high-voltage zener diode 20 from the useful-signal amplitude at the ends of the two secondary windings 17 and 18. When dimensioning the resonance circuit it must be borne in mind that the impedance of the capacitor transducer is essentially determined by the capacitance of the capacitor transducer itself. By the measures described, the required high amplitude of about 360 volt $U_{ss}$ of the transmission signal is obtained. Only with a signal amplitude which is so relatively high can good efficiency of a capacitor transducer be obtained.

Instead of a capacitor transducer 19 it is also conceivable, as alternative, to use a piezoelectric transducer 21. However, in order to be able to operate a piezoelectric transducer 21 with approximately the same power output as that of the capacitor transducer 19, it is necessary to effect a power matching via the transformer. This power matching is effected in the manner that the piezoelectric transducer 21 is connected via taps 22, 23 of the secondary windings 17 and 18 of the transformer $L_{01}$. In this way the transformer ratio of the transformer $L_{01}$ for the piezoelectric transducer 21 is less than for the capacitor transducer 19. The transducers 19 or 21 are used also as reception transducers in the transmission intervals, i.e. between two successive transmission pulses $U_{a\,14}$ in accordance with FIG. 2B. For the piezoelectric transducer 21, the connection via the taps 22 and 23 results in a correspondingly greater match with respect to voltage, which means that upon reception the considerable gain of about 10 to 15 dB S/N as compared with the direct connection to the following amplifier stage can be obtained.

By the symmetric design of the signal coupling in the reception operation of the transducers 19 or 21 via the two series-connected secondary windings 17 and 18 a good suppression of noise can also be obtained. Induced noise voltage from servomotors, electromechanical positioning members and the like is greatly reduced in advantageous fashion passively without additional expense.

The signals received from the transducer 19 or the transducer 21 are conducted over impedance transducer stages in the form of field effect transistors T 1 and T 2 in each case to the inverting and the noninverting inputs of the operational amplifier $S_1$. At the output of the operational amplifier $S_1$ there is provided a resonance circuit $L_{02}$ for the information signal. Furthermore, the information signal is amplified by the operational amplifier $S_2$ which is so connected with passive components that the amplification of the alternating-current signals is greater than 1 and is equal to 1 for direct-current signals. From the output of the operational amplifier $S_2$ a negative feedback (not denoted) is conducted to the inverting input of the operational amplifier $S_1$, said feedback being provided in order to stabilize the working points of the two operational amplifiers.

Figure 2C:
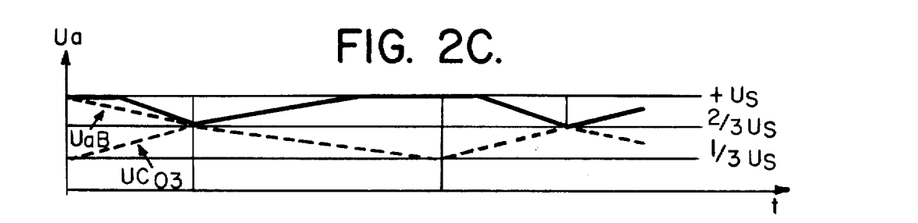
Figure 2D:
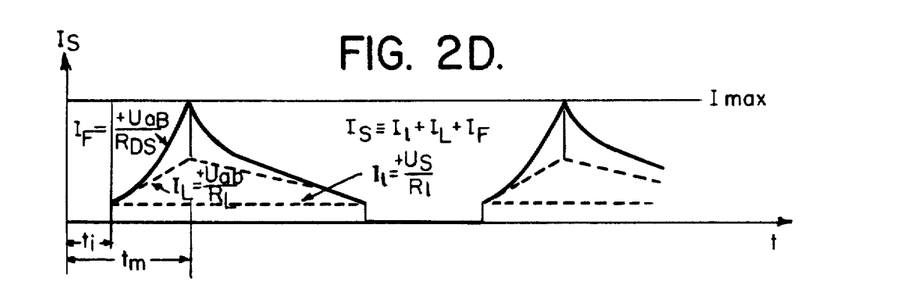

The operational amplifier $S_1$ furthermore has an input 24 via which its degree of amplification for the information signal can be adjusted. The amplification of the operational amplifier $S_1$ must increase over the transmit time of the measurement signals and as a matter of fact, the amplification control must have a logarithmic course since the attenuation of the echo signals is about 2.6 dB per meter with a signal frequency of about 50 kHz. The logarithmic course of the control current for the operational amplifier $S_1$ is shown in FIG. 2D and will be described further below. The circuit for the obtaining of the corresponding control current is shown in the block 25, shown in dashed line. The extent of the control of the amplification control must be about 50 dB for a maximum measurement value of 10 m.

The output signal of the operational amplifier $S_2$ is conducted, via an adjustment controller not shown, to the input 7 of the phase detector 8 of the PLL-selective-filter component 1 and processed in known manner by a quadrature phase detector so that, upon the arrival of an echo signal at one of the transducers 19, 21, a negative voltage jump $\bar{t}_i$ appears at the output 26. The time between the occurrence of the transmission pulse $t_i$ in accordance with the diagram of FIG. 2B and the occurrence of the negative voltage jump $\overline{t_i}$ at the output 26 of the frequency-selective filter is a measure of twice the distance between transmitter/receiver and the measurement object. In one suitable evaluation device, the conversion of the measured time into a distance measurement or into a signal for the adjusting of a photographic lens, a warning device or the like, can be effected.

Figure 2E:
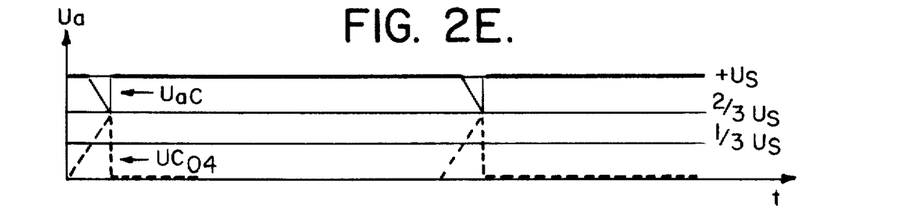

By means of the two operational amplifiers $S_6$ and $S_7$, which are connected one behind the other, there can be formed a device 27 for the frequency modulation of the transmission signal, which device is also controlled by the monostable multivibrator 14 of the device for the transmission pulse keying 11. The operational amplifier $S_6$ has its non-inverting input connected to the point D of the monostable multivibrator 14. A negative feedback leads from its output to its inverting input. The output of the operational amplifier $S_6$ is furthermore connected to the inverting input of the operational amplifier $S_7$ to the noninverting input of which there is fed a voltage having two-thirds the value of the supply voltage, which can be tapped off from the monostable multivibrator 14. The operational amplifier $S_7$ also has a negative feedback to the inverting input. At the output of the amplifier $S_7$ there can be tapped off a signal having a voltage course $U_{aC}$, shown in the diagram 2E. In dashed line there is shown the voltage at the capacitor $U_{C\,04}$ of the monostable multivibrator 14. The output signal of the stage 27 is fed via the RC member 28, 29 into the frequency-determining circuit having the components capacitor $C_{02}$ and resistor $R_{02}$ of the current-controlled oscillator 6 of the PLL frequency-selective filter 1 and, over a certain period of time of the transmission pulse, effects a frequency modulation of the carrier frequency of the transmission pulse. If an ultrasonic signal of fixed frequency is used for the distance measurement, reflections from different points of the object being photographed can cause interferences of the echo signals, which may even result in the cancelling of the echo at the receiver. This has the result that the receiver does not respond and erroneous measurements are effected. In particular, such cancellations can take place in the case of objects which are very close. However the provision of a device for the frequency modulation of the transmission signal involves merely measures which are intended to reduce the error rate upon measurements or eliminate any erroneous measurements which may take place. Detailed experiments have shown however that sufficient accuracy or certainty of the measurement for instance for amateur motion picture photographers is obtained even if one refrains from frequency modulation of the transmission signal.

As already described above, an amplification control of the operational amplifier $S_1$ of the signal receiver which is dependant on transit time is necessary, in which connection a current $I_S$ having a course which is logarithmic with respect to time is fed to the input 24 of the operational amplifier $S_1$. This course is shown in the diagram of FIG. 2D. It commences after the end of the transmission pulse $U_{a14}$ and terminates together with the pulse $U_{aA}$ of the clock generator 12. As can be seen, the current $I_S$ is formed, seen in the direction of its course, of three partial regions, namely $I_1$, $I_L$ and $I_F$. As can be noted from FIG. 2D, the current $I_1$ is a constant direct current which is present as from the moment of the start of operation of the receiver. The amplitude or size of the current determines the initial amplification of the operational amplifier $S_1$ of FIG. 1. It remains constant during the entire reception period. The current $I_L$ increases linearly also as from the time of the operating period of the receiver, and finally the current $I_F$ effects the logarithmic approximation of the control current as a whole.

The stage 25 within the frame drawn in dashed line has the purpose of producing the above-described current/time course $I_S$ from the voltage on the capacitor $C_{03}$ of the clock generator 12. The voltage on the capacitor $C_{03}$ or the point A increases from one-third of the value of the operating voltage $U_s$ during the pulse $U_{aA}$ of a duration of 60 milliseconds in accordance with FIG. 2A, to two-thirds of the value of the operating voltage $U_s$. Furthermore during the entire operation, a reference voltage equal to two-thirds of the operating voltage can be tapped off from the clock generator 12. The control stage 25 has two operational amplifiers $S_4$ and $S_5$, the operational amplifier $S_4$ having its noninverting input connected with the point A, i.e. with the capacitor $C_{03}$ of the clock generator 12. The output of the operational amplifier $S_4$ is connected, via a resistor (not designated), with the inverting input of the operational amplifier $S_5$ whose noninverting input is connected to the reference potential in an amount of two-thirds of the operating voltage $U_s$. To the output of the operational amplifier $S_5$ two PNP transistors $T_3$ and $T_4$ are connected via two different base series resistors, the emitter of the transistor $T_3$ being connected via the resistor $R_L$ with the supply voltage $U_s$ and the emitter of the transistor $T_4$ being connected directly to the supply voltage $U_s$. The collectors of the two transistors $T_3$ and $T_4$ are connected with each other via the resistor $R_1$, the current over the transistor $T_4$ and the resistor $R_1$ and the current over the transistor $T_3$ and the resistor $R_L$ being fed to the control input 24 of the operational amplifier $S_1$. In addition, parallel to the resistor $R_L$ there is provided the drain-source path of a field effect transistor $T_5$ whose gate electrode is connected with the tap of a voltage divider $P_1$ at the output of the operational amplifier $S_4$. From the point B (i.e. the emitter of the transistor $T_3$), a negative feedback leads via the adjustment controller $P_2$ to the inverting input of the operational amplifier $S_5$. By suitable selection or dimensioning of the resistances, the corresponding approximate logarithmic course of the current $I_s$ in accordance with the diagram of FIG. 2D can be produced over the resistors $R_1$, $R_L$ and $R_F$ (i.e. the resistance of the drain-source path of $T_5$) and the corresponding transistors $T_3$, $T_4$ and $T_5$. In the diagram of FIG. 2C, the course of the signal voltage at the point B of the control stage 25 is shown over the course of the voltage at the capacitor $C_{03}$ of the clock generator 12. It is essential that in themselves merely three components, namely the resistors $R_1$, $R_L$ and the drain-source path of the field effect transistor, are subject to a temperature variation, which might make compensation necessary. This could be effected in simple manner by suitable temperature-dependent components or the like. Similarly, the working point of the field effect transistor can be shifted into that region in which a temperature variation does not exert any substantial influence on the reproducibility of the current course $I_s$.

If the charge of the capacitor $C_{03}$ of the clock generator 12 is changed, for instance by a thermistor, then an adaptation of the different transit time of the ultrasonic signal can be effected as a function of the temperature of the air centrally from said stage of the transmitter pulse keying.

Figures 3A, 4:
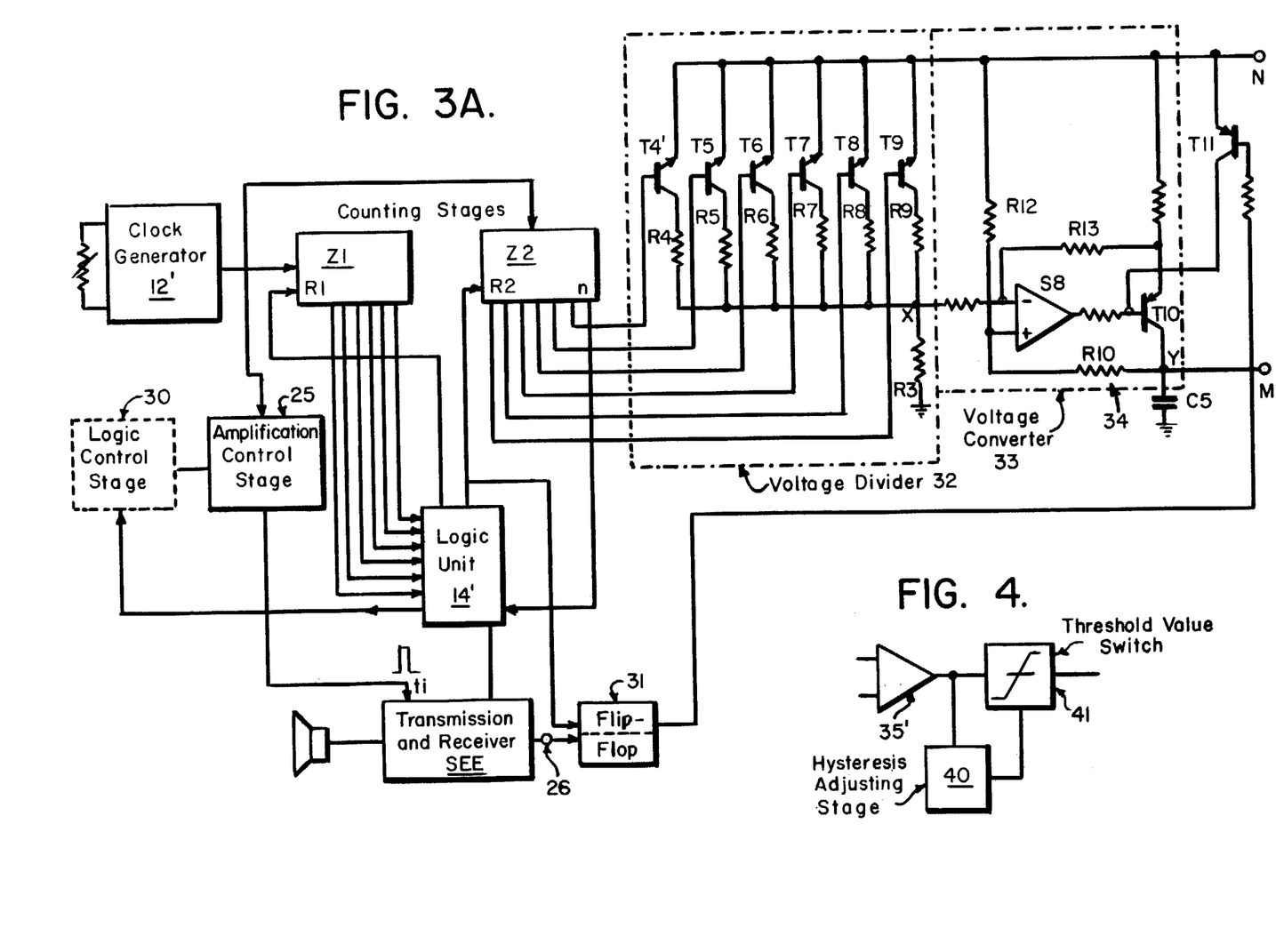
Figure 3B:
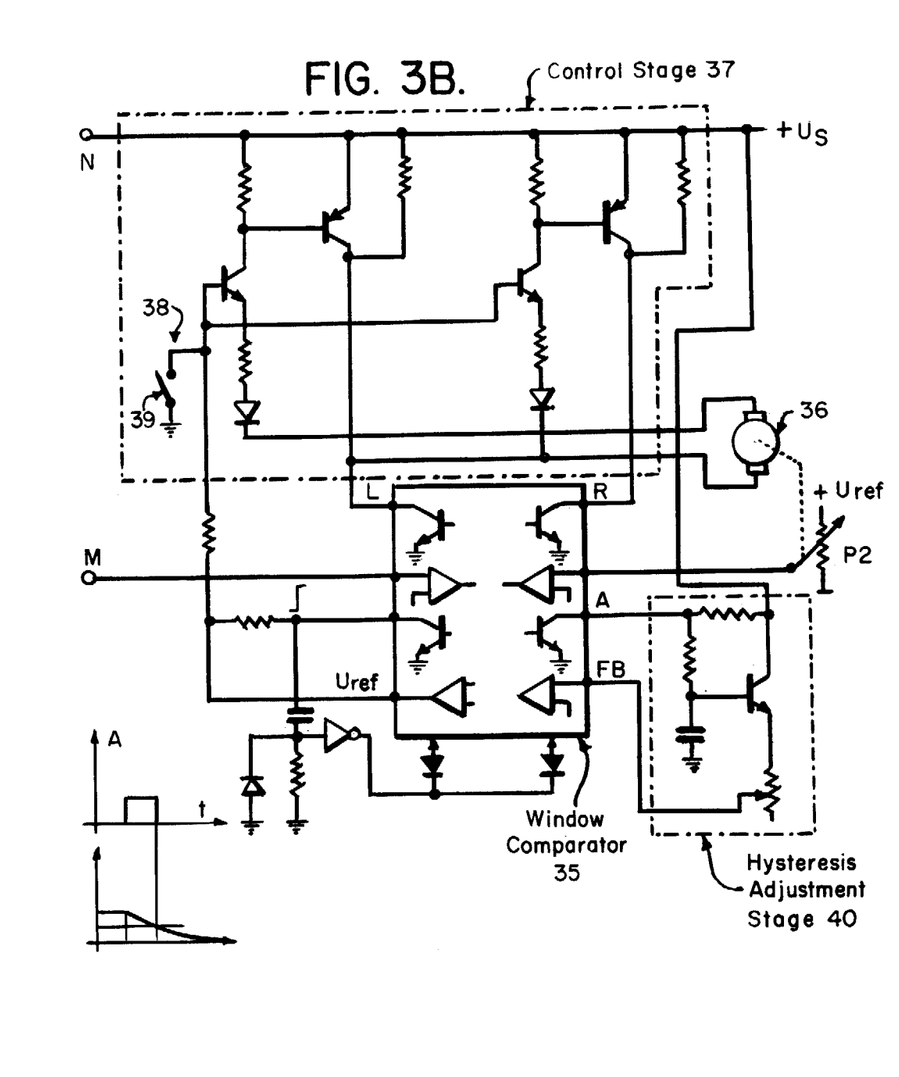

In the embodiment shown in FIGS. 3A, 3B, parts of the same function bear the same reference numbers as in FIG. 1. In particular, the transmission and reception electronics SEE can be developed in precisely the same manner as shown in FIG. 1. On the other hand, the transmission pulse keying device is different than in the case of the device 11 (FIG. 1). Here namely the pulses of a clock generator 12' become two counting stages Z 1, Z 2, of which counting stage Z 1 determines the time which corresponds to the transit time of signals which are reflected by objects which are at a distance away which is below the adjustment range of the lens and therefore for instance less than 1 meter away. The counting stage Z 2, on the other hand, determines the actual measurement time $t_m + t_p$ (see FIG. 1). As can be seen, the counting stage Z 2 is connected only by its output n to a logic unit 14' which, corresponding to the monostable multivibrator 14 of FIG. 1, gives off a pulse of predetermined duration $t_i$. The other outputs of the counting stage Z 2 are however connected to another device, which will be discussed further below.

The logic unit 14' has one output connected either directly or via another logic control stage 30 with the amplification control stage 25 which, for its own control furthermore receives the signals of the clock generator 12'. In addition, output signals of the logic unit 14' go to the corresponding reset inputs $R_1$, $R_2$ of the counting stages Z 1, Z 2. The signal fed to the reset input R 2 however also passes to an input of a flip-flop 31 whose other input receives a signal from the transmission and reception electronics SEE via the point 26 (see FIG. 1), the pulse flanks which occur at this point 26 allowing the flip-flop 31 to flip. The purpose of this flip-flop will be explained further below.

Figures 5, 7:
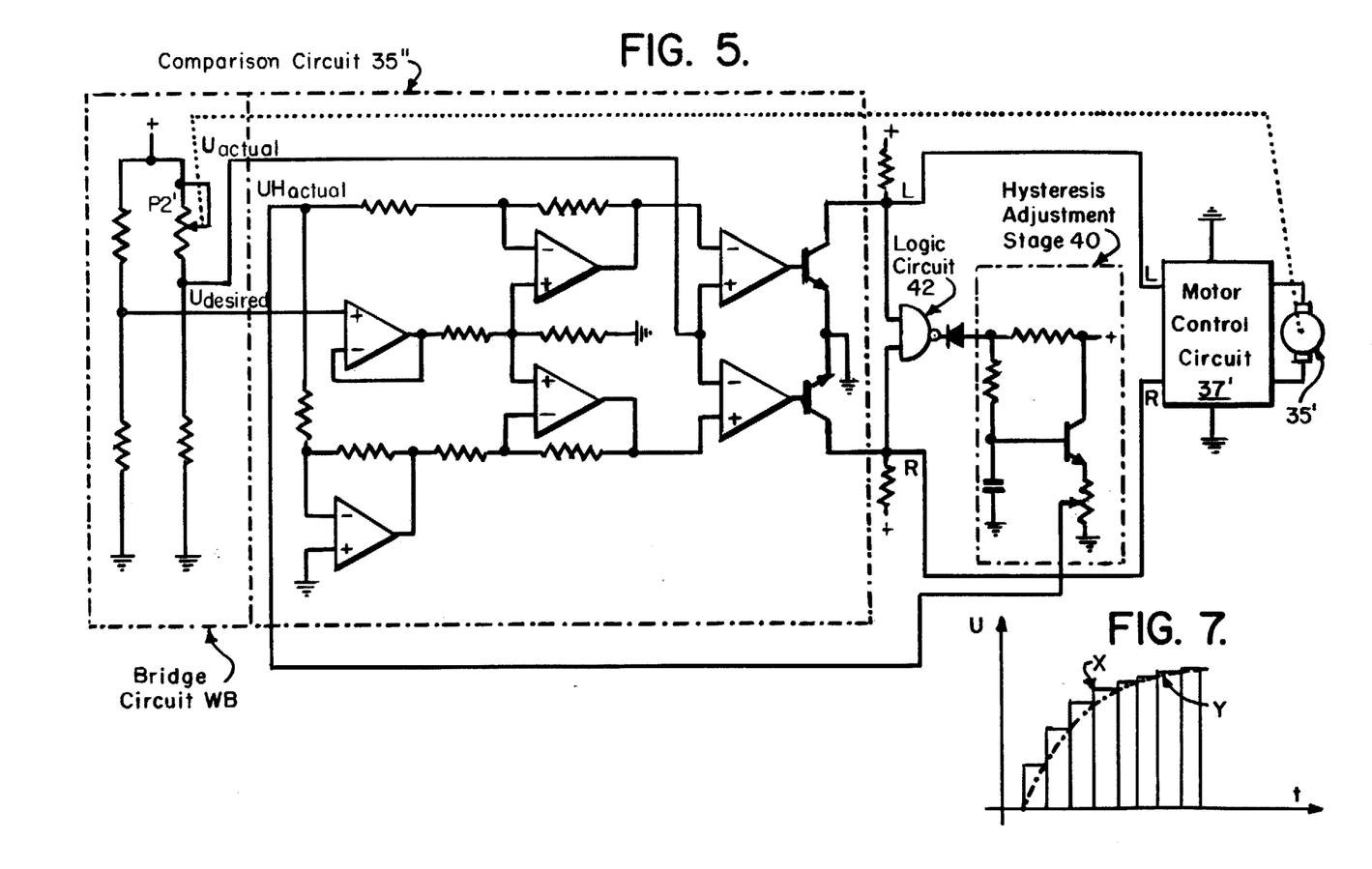
FIG. 5 is shown in another modification.
FIGS. 6A to 6C and FIG. 7 are diagrams of signal curves of the circuit in accordance with FIGS. 3A and 3B respectively.

For the focusing of an objective, a lens member, generally the front lens, is generally displaced axially by means of a threaded mount. In this connection, the relationship between angle of turn of the threaded mount of axial displacement of this lens member and the distance setting of the objective resulting therefrom corresponds to a hyperbolic function, of the formula $$y = a/(bx+1),$$

in which x is the distance setting and y the angle of turn or the axial displacement of the focusing lens member, while a and b are corresponding constants. In order now to establish such a hyperbolic function with electronic means, a voltage divider 32 is provided which in its one branch contains for instance, a predetermined resistor R 3 while in its other branch a large number of resistors R 4 to R 9 connected in parallel in the embodiment shown are provided, said number depending on the desired accuracy of the resolution. The desired effect could to be sure in itself also be obtained by a series connection of resistors, but the parallel connection shown is preferred. With each of the parallel resistors R 4 to R 9 there is associated a switch transistor T 4' and T 5 to T 9, by which the parallel resistors R 4 to R 9 can be connected one after the other so that the solid-line signal shown in FIG. 7 is obtained at the center tap X. For this purpose, the parallel resistors R 4 to R 9 are so graded that the following resistor in each case has only one half of the resistance of the preceding resistor. The switch transistors T 4' and T 5 to T 9 thus merely need be controlled cyclically in order to obtain at point X the function with respect to time shown in solid line in FIG. 7. For this, in accordance with the preferred embodiment of the invention, the counter Z 2 with all its outputs except for output n is used.

The signal obtained from the center tap X of the voltage divider 32 is then fed to a voltage converter 33 which has a comparison stage $S_8$, at the output of which there is arranged the transistor T 10. From the collector output of this transistor T 10 there can be obtained, at a point Y, the signal shown in dash-dot line in FIG. 7, which corresponds, with a high degree of approximation, to the desired hyperbolic function.

In order to obtain the greatest possible accuracy in the formation of the hyperbolic function at point Y, a capacitor member in the form of a capacitor $C_5$ is provided with this point, it being responsible for extensive approximation to the desired curve. Another improvement is obtained by a feedback circuit 34 which produces a resistance. In the embodiment shown, this feedback circuit 34 has a feedback resistor R 10 but, the latter can possibly be replaced by any other circuit which produces an ohmic resistance. In the circuit shown, the resistors R 10 to R 13 are, for instance, all selected of the same value.

In operation, by successive switching on of the parallel resistors R 4 to R 9 by the switch transistors T 4' and T 5 to T 9 the signal shown in solid line in FIG. 7 is produced at point X. In this connection, the start of this signal is synchronized with the transit time measurement over the transmission and receiver electronics SEE, in particular for the reason that the same counter Z 2 is used for both functional units. Therefore, the start of the signal at the point X also corresponds to the start of the transit time measurement, which is terminated when the signal sent out and reflected by the object aimed at is again received. At this time, via the flip-flop 31, a transistor T 11 is activated, it interrupting the output signal at the point Y. The last signal value obtained at the point Y thus corresponds to the measured desired value to which the objective of a camera is to be set.

For this purpose there is shown in FIG. 3B a circuit which connects to the terminals M and N of FIG. 3A. The circuit shown in FIG. 3B has, in particular, a window comparator 35 as comparison stage, which now receives its desired value from point Y (see FIG. 3A) via the terminal M and, on the other hand, via a potentiometer P2 connected with the focusing member of the objective lens (not shown) and thus also with the focusing motor 36, an actual value which corresponds to the instantaneous position of the focusing member. Depending on the deviation of this actual value from the desired value, the motor 36 is activated by one of the outputs L or R of the window comparator 35 via a control stage 37. This control stage 37 represents a particularly simple embodiment in which, in each case, one of the outputs L or R of the window comparator 35 can be connected by means of switch transistors to the operating voltage $U_S$. For the further influencing of the circuit there is provided a stop input 38, for which merely a switch 39 is shown in the drawing. Instead of a switch 39 which is to be actuated arbitrarily there can however be connected here a logic stage which, in case of doubtful measurement results, stops the motor 36 in the most probable focusing position. By means of the switch 39 (or a circuit replacing it) in any event the reference voltage $U_{ref}$ which is obtained from an output of the window comparator 35 and fed to the stage 37 is conducted to ground.

Figure 6A:
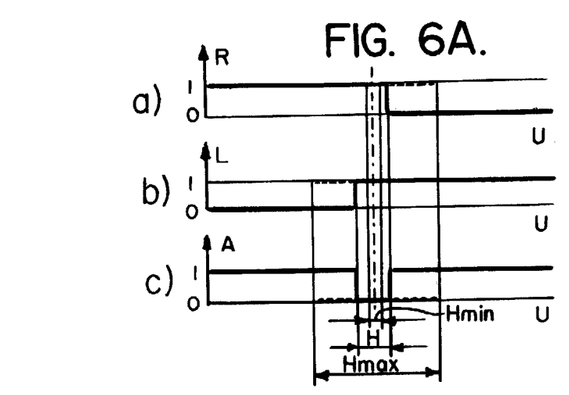

In order now to stop, as far as possible, the oscillating of the system which occurs frequently in regulating and control systems, the hysteresis of the window comparator 35 is variable in accordance with the difference between desired value and actual value. In case of a large difference there is accordingly obtained a large hysteresis, which also becomes smaller upon decrease in the difference. For this purpose, there is provided a hysteresis adjustment stage 40 which receives, from an output A of the window comparator 35, a signal such as shown in diagram b of FIG. 6B with respect to time. The course of the signal at the output A of the window comparator 35 with respect to the difference voltage U can be noted from diagram e of FIG. 6A. In this connection, the maximum changes as a result of the varying hysteresis are also indicated in dashed line. By way of comparison, diagrams a and b of FIG. 6A show the signals at the outputs L and R respectively of the window comparator 35 with varying difference voltage U.

Figure 6B:
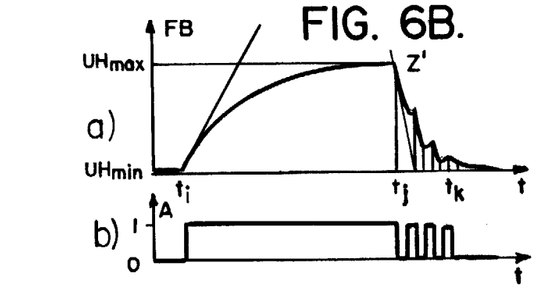

By means of the hysteresis adjustment stage there is produced a signal which is fed for the corresponding adjustment of the hysteresis to an input $F_B$ of the window comparator 35 and the course of which in time is shown in diagram a of FIG. 6B.

Figure 6C:
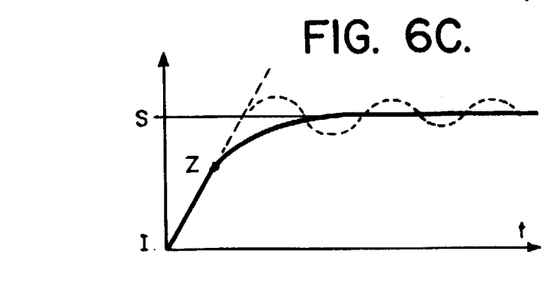

This method, namely regulating the hysteresis in accordance with the deviation of the actual value from the desired value, has proven particularly favorable for the avoidance of oscillations. In this connection it is not absolutely necessary to control the hysteresis in proportion to the deviation of the actual value but rather this can also be done in steps or in such a manner that in case of large deviations the hysteresis at first remains unchanged and is only then changed, for instance proportionally. The method can be employed in practice with any regulating or control process regardless for what purpose. In each case there is obtained a control behavior such as shown in FIG. 6C. In this connection the control system, commencing with the actual value I, strives towards the desired value S, doing so at first linearly corresponding to the course of the dash-dot-line. In known systems, after the exceeding- of the desired value S there then resulted an oscillation build-up corresponding to the dash line, which however in practice never reached a dead center quiescent point since, in practice, new disturbances always occurred (for instance, due to the fact that the target aimed at which is to be measured moved). By the displacement of the hysteresis in accordance with the invention, the setting member follows in its movement first of all, to be sure, the dot-dash line, but only up to a point Z. This point Z corresponds to a point Z' of the diagram a of FIG. 6B. Then however one obtains an oscillation-free approach to the desired value or the desired position of the setting member, which in particular remains unaffected by purely random disturbance factors even if the logic circuit is coupled to the stop input 38 (see FIG. 3B).

For the adjustment of the hysteresis, circuits other than that shown in FIG. 3B are also suitable. For example, in accordance with FIG. 4 a threshhold value switch 41 can be provided at the output of a comparison stage 35, the hysteresis of which switch can be adjusted by means of the stage 40. Of course however switch stages, for instance threshold value switches, can also be provided at the input and/or output of the hysteresis adjusting stage 40 in order to change the hysteresis in stages.

FIG. 5 shows a different circuit, such as can be provided in any desired control system, for instance in a diaphragm control system of a camera. In this case, a comparison circuit 35'' is connected to a bridge circuit WB having at least one variable resistor P 2', said comparison circuit having two output L and R, to which there is connected a motor control circuit 37' which may correspond for instance to the circuit 37 of FIG. 3B. By means of the motor control circuit 37', a motor 36' is controlled which in its turn displaces the resistance at P 2'. For example, this can be done in the manner that this resistance is formed of a photo-resistor in front of which the diaphragm controlled by the motor 36' is displaced.

In order now to be able to change the hysteresis of the comparison circuit 35'' by means of the hysteresis adjusting stage 40, the latter is fed from the outputs L, R of the comparison circuit 35'' over a logical circuit 42 which, in the embodiment shown, is connected to the two outputs L and R of the comparison stage 35''. On the other hand if it is desired to change the hysteresis proportionally to the deviation of the actual value only as from a predetermined threshold value, this logic circuit 42 could also be developed in the manner that it has a threshhold value stage at the input of at least one gate circuit, possibly one gate circuit for each adjustment direction, while the output signal of the comparison circuit is fed directly to the other input of the gate circuit. As soon as the threshhold value is reached, the gate then opens and permits the passage of the difference signal of the corresponding comparison stage (for instance of the comparison stage 35' of FIG. 4) to control the hysteresis adjustment stage 40.

All reference numerals provided in the claims are merely for ready identification with the drawings and specification references for ready reference, and are provided by example only and not for limitation.

I claim:

1. In a device for the transit time measurement of electric, electromagnetic and acoustic signals, particularly supersonic signals, of at least one predetermined frequency range, having a signal transmitter for the sending of measurement signals to an object and a signal receiver for receiving the measurement signals reflected by the object of a substantially predetermined frequency and having a time measuring device for determining the transit time of the measurement signals between the device and the object, from which the distance of the object from the device can be derived, the improvement comprising signal generator means (6) for both at least triggering the signal transmitter (10, $L_{01}$) and for controlling the signal receiver (1-8), filter stage means (1) for tuning the signal receiver, said filter stage means being connected with said signal generator, a signal transducer having terminals, a transformer ($L_{01}$) has two symmetrical secondary windings (17, 18) which are connected in series with each other and which are connected via a center tap thereof with a reference potential and at other connections thereof at least indirectly to the terminals of said signal transducer, at least one amplifier stage (10) is connected to said transformer and to an output of said signal generator means with the output signal of said signal generator means being adapted, via said at least one amplifier stage, to feed said transformer ($L_{01}$).

2. The device as set forth in claim 1, wherein said signal transducer is an ultrasonic-capacitor transmitter-and/or reception-transducer (19).

3. The device according to claim 1, further comprising
- a piezotransducer (21) constitutes said signal transducer,
- a winding tap (22, 23) on each of said secondary windings (18, 17), respectively, symmetrically disposed and connected to said piezotransducer (21) and adapted to trigger a transmission operation of said piezotransducer,
- said secondary windings (17, 18) during a reception operation with said two winding taps constitute an auto-transformer for echo measurement signals received by said piezoelectric (transmission) transducer adapted to be used as a reception transducer.

4. The device according to claim 1, further comprising
- a capacitor is connected in parallel to the series connection of said two secondary windings (17, 18) of said transformer ($L_{01}$) and constitutes means for the resonance matching of said signal transducer (19).

5. The device as set forth in claim 4, wherein said signal transducer constitutes a transmitter and receiver signal transducer.

6. A device for the transit time measurement of electric, electromagnetic and acoustic signals, and particularly ultrasonic signals, of at least one predetermined frequency range, having a signal transmitter triggered by a signal generator for the sending of measurement signals to an object and a signal receiver having a signal transducer and a transformer connected to the latter in order to receive the measurement signal reflected from the object and having a time measuring device for determining the transit time of the measurement signals between the device and the object from which the distance of the object from the device can be derived according to claim 1, including
- impedance transducer stages (T1, T2) respectively connected to said two symmetrical secondary windings (17, 18) of said transformer ($L_{01}$),
- a first operational amplifier ($S_1$) having inverting and non-inverting inputs,
- said impedance transducer stages are connected to said inverting and non-inverting inputs, whereby output signals of said two symmetrical windings are fed respectively via said impedance transducer stages to said inverting and non-inverting inputs,
- a resonant circuit means ($L_{02}$) for providing a useful signal,
- a second operational amplifier ($S_2$) having an amplification greater than 1 for alternating current signals and equal to 1 for direct current signals, said second operational amplifier is connected to an output of said first operational amplifier via said resonant circuit means,
- a common negative feedback means connected to both said operational amplifiers ($S_1$, $S_2$) for stabilizing their operating points,
- current-dependent amplification control means is connected to an input (24) of said first operational amplifier ($S_1$) the amplification control of the latter.

7. The device according to claim 6, wherein said amplification control means comprises a current generator means (25) having an output signal which has a logarithmic course over the transit time of the measurement signal for the current-dependent amplification control of said first operational amplifier ($S_1$).

8. In a device for the transit time measurement of electric, electromagnetic and acoustic signals, particularly supersonic signals, of at least one predetermined frequency range, having a signal transmitter for the sending of measurement signals to an object and a signal receiver for receiving the measurement signals reflected by the object of a substantially predetermined frequency and having a time measuring device for determining the transit time of the measurement signals between the device and the object, from which the distance of the object from the device can be derived, the improvement comprising
- signal generator means (6) for both at least triggering the signal transmitter (10, $L_{01}$) and for controlling the signal receiver (1–8),
- filter stage means (1) for tuning the signal receiver, said filter stage means being connected with said signal generator,
- said signal generator means (6) is a reference oscillator of said filter stage means,
- said filter stage means is a frequency-selective filter (1) having a phase control circuit (2),
- said filter has a phase detector (8),
- operational amplifier means ($S_2$) has an output for feeding an output signal thereof to said phase detector (8) of said filter (1) which has said phase control circuit (2).

9. In a device for the transit time measurement of electric, electromagnetic and acoustic signals, particularly supersonic signals, of at least one predetermined frequency range, having a signal transmitter for the sending of measurement signals to an object and a signal receiver for receiving the measurement signals reflected by the object of a substantially predetermined frequency and having a time measuring device for determining the transit time of the measurement signals between the device and the object, from which the distance of the object from the device can be derived, the improvement comprising
- signal generator means (6) for both at least triggering the signal transmitter (10, $L_{01}$) and for controlling the signal receiver (1–8),
- filter stage means (1) for tuning the signal receiver, said filter stage means being connected with said signal generator,
- said signal generator means (6) is a reference oscillator of said filter stage means,
- said filter stage means is a frequency-selective filter (1) having a phase control circuit (2),
- means for feeding a signal for frequency modulation (from 27) of a transmission signal to said reference oscillator of said filter having said phase control circuit (2) at least over a partial region of each transmission pulse sent out by said signal transmitter (19 or 21).

10. A device for the transit time measurement of electric, electromagnetic and acoustic signals, particularly ultrasonic signals, of at least one predetermined frequency range, having a signal transmitter for sending measurement transmission signals to an object and a signal receiver for receiving the measurement transmission signals reflected by the object, as well as a time measurement device for determining the transit time for the measurement transmission signals between the device and the object from which the distance of the object from the device can be derived, comprising signal generator means (6) for both at least triggering the signal transmitter (10, $L_{01}$) and for controlling the signal receiver (1-8), filter stage means (1) for tuning the signal receiver, said filter stage means being connected with said signal generator, a transformer ($L_{01}$) having a primary winding (10), at least one signal transducer connected with said transformer, a current generator means (25) for amplification control of the signal receiver ($S_1$, $S_2$, 1, 2-8), a clock generator stage means (12) for controlling the transmission and reception operation of the device for the transit time measurement, said clock generator means has a periodic output pulse ($U_{aA}$) at least for the indirect actuation of said primary winding (16) of said transformer ($L_{01}$), for triggering said current generator (25), and for at least indirect production of a starting pulse for the transit time measurement period.

11. The device as set forth in claim 10, wherein
said filter stage means has a phase-control circuit,
the length of the transit time measurement period is determined by an output signal (at 26) of said filter stage means (1-8) which has said phase-control circuit.

12. The device as set forth in claim 10, further comprising
a function generator means (27) for frequency modulation of the transmission signal,
said clock generator means with said periodic pulse is for activation of said function generator means (27) for the frequency modulation of the transmission signals.

13. The device according to claim 10, further comprising
a monostable multivibrator (14; 14'),
said clock generator means is connected such that said periodic output pulse ($U_{aA}$) feeds said monostable multivibrator (14; 14') to form the starting pulse.

14. The device according to claim 10, including
a window pulse generator means (35) for providing a window pulse and for amplification control of said signal receiver and for placing the transit time measurement in operation only during an opening time of the window pulse, while the amplification can be reduced substantially to zero during measurement intervals.

15. The device according to claim 13, including
a window pulse generator means (35) for providing a window pulse and for amplification control of said signal receiver and for placing the transit time measurement in operation only during an opening time of the window pulse, while the amplification can be reduced substantially to zero during measurement intervals.

16. The device according to claim 14, wherein
said window pulse generator means (35) is operatively connected at an output of said clock generator means (12) and the transit time of the measurement signals between the device and the object from which the distance of the object from the device can be derived including
a signal transducer having terminals, a transformer ($L_{01}$) has two symmetrical secondary windings (17, 18) which are connected in series with each other and which are connected via a center tap thereof with a reference potential and at other connections thereof at least indirectly to the terminals of said signal transducer, at least one amplifier stage (10) is connected to said transformer and to an output of said signal generator means with the output signal of said signal generator means being adapted, via said at least one amplifier stage, to feed said transformer ($L_{01}$), impedance transducer stages (T1, T2) respectively connected to said two symmetrical secondary windings (17, 18) of said transformer ($L_{01}$), a first operational amplifier ($S_1$) having inverting and non-inverting inputs, said impedance transducer stages are connected to said inverting and non-inverting inputs, whereby output signals of said two symmetrical windings are fed respectively via said impedance transducer stages to said inverting and non-inverting inputs, a resonant circuit means ($L_{02}$) for providing a useful signal, a second operational amplifier ($S_2$) having an amplification greater than 1 for alternating current signals and equal to 1 for direct current signals, said second operational amplifier is connected to an output of said first operational amplifier via said resonant circuit means, a common negative feedback means connected to both said operational amplifiers ($S_1$, $S_2$) for stabilizing their operating points, is for producing said window pulse of a predetermined total time, said window pulse determining the opening time and pause time, said window pulse generator means comprises two counting stages each having a time constant (corresponding to one of the three said times) with a predetermined clock frequency.

17. The device as set forth in claim 15, wherein
said window pulse generator means (35) is operatively connected at an output of said clock generator means (12) and is for producing said window pulse of a predetermined total time, said window pulse determining the opening time and pause time,
said window pulse generator means comprises two counting stages each having a time constant (corresponding to one of the three said times) with a predetermined clock frequency.

18. The device according to claim 17, further comprising
a logic circuit which contains said monostable multivibrator is operatively connected at an output of said counting stages.

19. A device for the transit time measurement of electric, electromagnetic and acoustic signals, and particularly ultrasonic signals of at least one predetermined frequency range, having a signal transmitter for the sending of measurement signals to an object and a signal receiver having at least one reception amplifier for the measurement signals reflected by the object and transduced by means of a signal transducer, and a time measuring device for determining the transit time of the measurement signals between the device and the object from which time the distance of the object from the device can be derived, comprising signal generator means (6) for both at least triggering the signal transmitter (10, $L_{01}$) and for controlling the signal receiver (1-8), filter stage means (1) for tuning the signal receiver, said filter stage means being connected with said signal generator, at least one receiver amplifier ($S_1$), transistors ($T_3$, $T_4$) and first means for control of the amplification of said at least one receiver amplifier ($S_1$) as a function of the transit time and current, by a signal ($U_{co3}$) which changes linearly over the time of the transmission pulse at least over a part of the duration, for triggering said transistors ($T_3$, $T_4$), said transistors have load circuits, ohmic resistances ($R_1$, $R_2$) connected in said load circuits of said transistors, respectively, base series resistors connected to the base of said transistors, respectively, said transistors ($T_3$, $T_4$) are triggered by said first means via said base series resistors, a semi-conductor path (D, S) is connected in parallel to one of said ohmic resistance ($R_L$), said semi-conductor path (D, S) being triggered at least indirectly also by said changing signal ($U_{co3}$), whereby the entire current ($I_S = I_1 + I_L + I_F$) through said ohmic resistances ($R_L$, $R_1$) and the said semi-conductor path (D, S, TS) varying in value with time resulting in a non-linear, preferably adapted logarithmic or exponential course during reception-readiness time of the measurement signal receiver (1-8).

20. The device as set forth in claim 19, wherein said transistors constitute two transistor.

21. The device as set forth in claim 19, wherein said semi-conductor path comprises a field effect transistor.

22. The device as set forth in claim 19, wherein said semi-conductor path is a drain-source path (D, S) of a field effect transistor.

23. The device as set forth in claim 1, 2, 3, 4, 5, 6, 7, 11, or 12, wherein said signal generator means (6) is a reference oscillator of said filter stage means, said filter stage means is a frequency-selective filter (1) having a phase control circuit (2).

* * * * *